April 12, 1932. K. VON KANDO 1,853,646
COOLING SYSTEM FOR DYNAMO ELECTRIC MACHINES
Filed Jan. 30, 1930
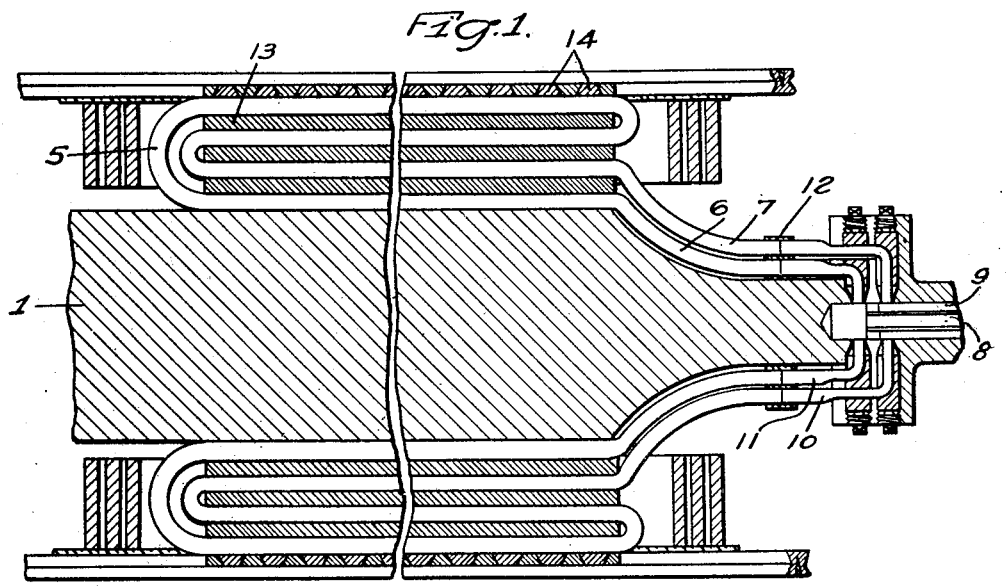
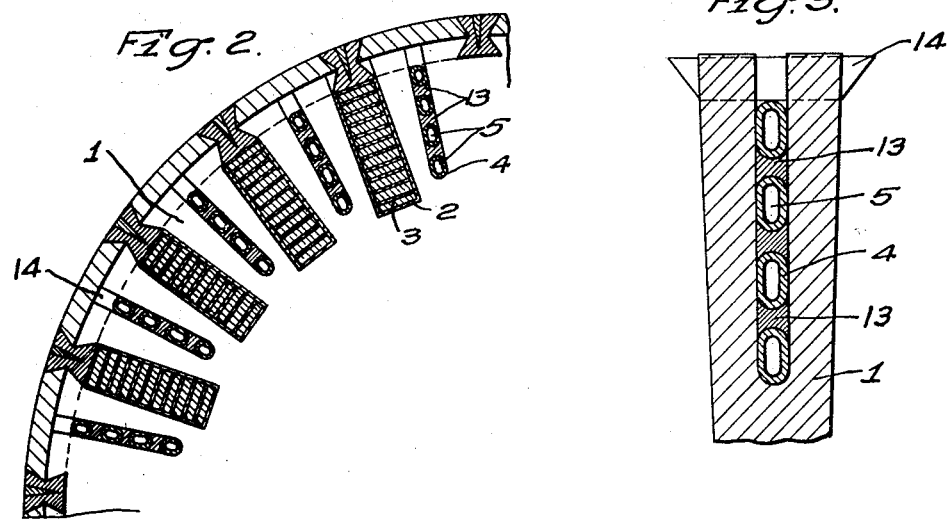
INVENTOR
Kalman Von Kando.
BY
ATTORNEY Patented Apr. 12, 1932

1,853,646

UNITED STATES PATENT OFFICE

KALMAN VON KANDO, OF BUDAPEST, HUNGARY, ASSIGNOR TO WESTINGHOUSE ELECTRIC & MANUFACTURING COMPANY, A CORPORATION OF PENNSYLVANIA

COOLING SYSTEM FOR DYNAMO-ELECTRIC MACHINES

Application filed January 30, 1930. Serial No. 424,610.

My invention relates to an improved cooling system for dynamo-electric machines.

My invention also relates to an improved cooling element for such a machine.

My invention further relates to an improved connection for the element.

Prior to my invention, water-cooled dynamo-electric machines have been generally unsatisfactory for several reasons, among which have been the following. There has been great difficulty in finding the proper position for cooling coils, so that they will satisfactorily dissipate the heat generated by the windings. Also there has been great difficulty in inserting these coils. Usually, they have been inserted in holes drilled in the rotor. Considerable difficulty has been experienced in bringing these coils into such intimate contact with the metal of the rotor as to furnish good heat-conducting contact. A source of great annoyance in previous water-cooled machines has been the damage caused by leakage of water from the connections of the coils into the windings of the machine. Another annoyance has been the necessity of having water connections at both ends of the rotor, which is substantially impossible in the case of turbo-generators, to which my invention particularly relates, because of the presence of the turbine at one end of the dynamo-electric machine.

It is an object of my invention to provide an improved cooling system for dynamo-electric machines.

It is a further object to provide an improved coil or element for such a system.

It is a further object to provide inlet and discharge connections for the cooling coils at the same end of the rotor.

It is a further object to provide the connections of the cooling coil at a point beyond the windings in the machine.

It is a further object to place the coils in slots in the rotor positioned between the usual winding slots of the rotor.

It is a further object to provide an improved connection for the cooling coils.

It is a further object to provide a means for securing good thermal contact between the cooling coils and the metal of the rotor.

It is a further object to so shape the coils that they may be easily inserted in, or removed from, the slots in the rotor.

Other objects and advantages of my invention will be apparent from the following detailed description in conjunction with the annexed drawings, in which Figure 1 is a sectional elevation of a rotor having my invention attached;

Fig. 2 is a cross section of the rotor showing the disposition of the cooling coils in the rotor, and Fig. 3 is an enlarged cross sectional view of one element of the cooling system.

The machine disclosed in the drawings comprises a rotor 1 of a dynamo-electric machine to be attached at one end to a prime mover, not shown, and to be supported at the other end in a bearing, not shown. The rotor is provided with winding slots 2 in which are disposed the windings 3 as is usual in such machines. Between these winding slots, I provide narrower slots 4, in each of which is disposed one of my cooling elements or water-coils 5. These cooling elements are composed of a plurality of turns of edge-wound flattened tubing.

Preferably, these water-coils are formed by flattening ordinary round tubing, bending the tubing into an open or U-shaped loop and then bending the loop edgewise upon itself to provide the desired number of turns in any given plane passing through the axis of the rotor. This bending is done in such a manner that, in the finished loop, the longest or major axis of the tubing lies in the plane of the finished coil.

The free or connecting ends 6 and 7 of each of the water-coils are preferably left unflattened. These ends protrude from the core portion of the rotor into the vicinity of the bearing which supports the free end of the rotor. These protruding ends 6 and 7 are bent convexly toward the rotor in such a manner that the connections will be placed under compression under the influence of the centrifugal force generated when the rotor is in motion.

The extended end portions 6 and 7, being at a distance from the rotor core sufficient to clear the windings of the machine, are attached in any suitable manner to a source of cooling fluid and to a discharge system to receive the water from the cooling coils.

I prefer to provide water supply and discharge means coaxial with the rotor, by drilling a hole 8 in the axis of the rotor and providing a connection from this axial hole or chamber to each of the inlet openings 6 of the water-coils.

A further passage 9, coaxial with the inlet passage 8, is provided to receive the discharge fluid from the water-coils. Both the inlet and discharge passages 8 and 9 are connected to the ends of the water-coils by means of short lengths of L-shaped tubing 10 and 11 which may be either brazed in place or held in place by providing the conical seats in the passages in the rotor and clamping the ends of its L-shaped members against the conical seats. These L-shaped connectors are united to the extending portions 6 and 7 of the cooling coils by means brazed on collars 12 which are preferably first slipped on the coils, then placed in position at the joint between the extension of the coils and the L-shaped members and then brazed in place.

If the L-shaped members 10 and 11 were first brazed into the rotor, it would be preferable to do the second brazing with a brazing material of lower melting point than that first used.

The cooling coils 5, being flattened, in cross-section, to a diameter slightly less than the diameter of the slots 4 in which they are received, are placed in these slots usually with spacing elements 13 between the individual turns of the coil. These spacing elements are preferably made of good heat-conducting metal. After being placed in the slots, these coils might be secured by brazing or welding, but I prefer to hold these coils in place by means of wedge members 14 such as are used to retain the usual winding of the machine. In this manner, by removing the wedges, the coils may be easily removed in case there is a necessity for the replacement of any of the coils.

In operation, the water-coils 5 and spacers 13 are assembled, as a unit, and placed in the machine in slots 4 which are of slightly greater width than the cooling units. These units are then connected to the water supply and discharge means 8 and 9, after which, the units are wedged securely in place in the rotor. Upon the admission of a cooling fluid, such as water, to the coils 5, when the machine has been put in motion, the centrifugal force generated in the machine, in conjunction with, and in addition to, the circulating pressure of the water, will cause the flattened portions of the coils to tend to return to the round condition. This tendency will cause the coils to spread or be distended into intimate contact with the sides of the slots in which the coils are placed. In this manner, a good heat-conducting contact is provided between the coils and the metal of the rotor. Also, in case it is necessary to remove any of the coils, the relief of the internal pressure in the coil, on stopping the machine and turning off the water, will allow the coil to resume its original flattened condition and thus provide for easy removal of the coil from the slot.

The connections 12 to the coils are at a point beyond the windings of the motor, and hence any leakage from such connections would be thrown free of the windings and, consequently, no trouble is to be experienced from any leakage which might possibly occur.

Since the extended end portions 6 and 7 of the coil are bowed convexly toward the rotor, the centrifugal force set up by the rotation of the machine places these elements under compression, so that there is no tendency for the coil ends to pull out or disturb the connections 12 between the coil ends and the source of supply or discharge to which they are connected.

I claim as my invention:

1. In combination with the rotor of a dynamo-electric machine having slots between the winding slots, cooling coils in said slots, said coils being composed of flattened tubing, and means at one end of the rotor to supply cooling fluid to and discharge cooling fluid from the coils.

2. In combination with the rotor of a dynamo-electric machine having slots between the winding slots, a cooling coil in said slots, said coil being composed of flattened tubing, and means at one end of the rotor to supply cooling fluid to and discharge cooling fluid from the coils, said supply and discharge means being connected to the cooling coil at a point beyond the windings of the rotor.

3. In combination with the rotor of a dynamo-electric machine having slots between the winding slots, a cooling coil in said slots, said coil being composed of flattened tubing, and means at one end of the rotor to supply cooling fluid to and discharge cooling fluid from the coils, said supply and discharge means being connected to the cooling coil at a point beyond the windings of the rotor, the end of the tubing extending from the cooling coil to the said supply and discharge means being convexly bowed toward the rotor.

4. In combination with the rotor of a dynamo-electric machine having slots between the winding slots, cooling coils in said slots, said coils being composed of flattened tubing, and means at one end of the rotor to supply cooling fluid to and discharge cooling fluid from the coils, the end of the tubing extending from the cooling coil to the said supply and discharge means being convexly bowed toward the rotor.

5. A cooling coil to be inserted in a slot which comprises a flattened tubular element bent upon itself to form a plane serpentine coil, the major diameter of the tubular element being in the plane of the coil, the minor diameter of the tubular element being less than the width of the slot to facilitate assembly, said tubular element being distendable under internal pressure to bring a large area of the walls of tubular element into contact with the walls of the slot.

6. A cooling coil for the rotor of a dynamo-electric machine comprising a plurality of turns of tubing, both ends of the tubing being at the same end of the coil, all portions of the coil being in the same plane, the tubing being flattened in the plane of the loop to facilitate the assembly of the coil in a slot, the said tubing being distendable in a direction transverse to the plane of the loop when subject to internal pressure, the ends of the tubing being unflattened and extending beyond the body of the coil, said ends being bowed for preventing distortion under centrifugal stress.

7. A cooling system for the rotor of dynamo-electric machines which comprises slots in the body of the rotor between the winding slots, fluid carrying coils in said slots, means at one end of the rotor for introducing fluid into the coils and means at the same end of the rotor to discharge the fluid from the coils.

8. A cooling system for dynamo-electric machines comprising a series of radial slots in the rotor of the machine and between the windings of the rotor coils in said slots, means coaxial with the rotor for supplying cooling fluid to the coils and means concentric with the first means for discharging cooling fluid from the coils, connecting means comprising an extension of the ends of the coils for connecting the coils to the supply and discharge means, said connecting means being convexly bowed toward the rotor.

9. A cooling system comprising a dynamo-electric machine, said machine having a plurality of slots in the body of the rotor, a plurality of fluid passages extending inwardly in one end of the rotor shaft, and a plurality of radial openings connecting with said passages, connectors secured in said openings, a cooling coil in each of said slots, end portions of the coils extending from the coils to the connectors and being integrally united thereto, said end portions being bowed toward the rotor, and the portion of the coils within the slots being flattened in the plane of the slots.

10. In combination with the rotor of a dynamo-electric machine, a cooling coil embedded in the rotor between the winding slots, said rotor having a passage in one end of the rotor shaft for admitting cooling-water and a passage in the same end of the shaft to discharge the water, the coil being composed of tubing flattened in the plane of the coil and having the ends of the tubing extending from the coil to the said passages, and means for connecting the said ends to said passages.

In testimony whereof, I have hereunto subscribed my name this eighth day of January, 1930.

KALMAN VON KANDO.